(12) United States Patent
Yamanouchi

(10) Patent No.: US 6,191,888 B1
(45) Date of Patent: *Feb. 20, 2001

(54) BINOCULAR

(75) Inventor: Haruhiko Yamanouchi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/919,696

(22) Filed: Aug. 28, 1997

(30) Foreign Application Priority Data

Sep. 9, 1996 (JP) .................................................. 8-260213

(51) Int. Cl.[7] ............................. G02B 27/64; G02B 23/00
(52) U.S. Cl. ........................... 359/557; 359/407; 359/554
(58) Field of Search ..................................... 359/554–557, 359/813, 814, 823, 824, 407–420; 396/52–55; 348/208

(56) References Cited

U.S. PATENT DOCUMENTS

| | | | |
|---|---|---|---|
| 3,582,180 | * 6/1971 | Gross | 359/554 |
| 3,597,041 | * 8/1971 | Frantz | 359/411 |
| 5,754,339 | * 5/1998 | Kanai et al. | 359/557 |
| 5,917,653 | * 6/1999 | Taniguchi | 359/557 |
| 6,046,853 | * 4/2000 | Yano | 359/557 |

FOREIGN PATENT DOCUMENTS 7-43645 * 2/1995 (JP) ..................................... 359/557

* cited by examiner

Primary Examiner—Thong Nguyen
(74) Attorney, Agent, or Firm—Robin, Blecker & Daley

(57) ABSTRACT

A binocular includes a pair of objective lenses, a pair of eyepieces for observing images formed by the pair of objective lenses, and a connection member arranged to integrally interconnect at least respective parts of the pair of objective lenses, wherein optical images being observed are stabilized by driving and decentering the connection member with respect to optical axes of the pair of objective lenses.

5 Claims, 5 Drawing Sheets

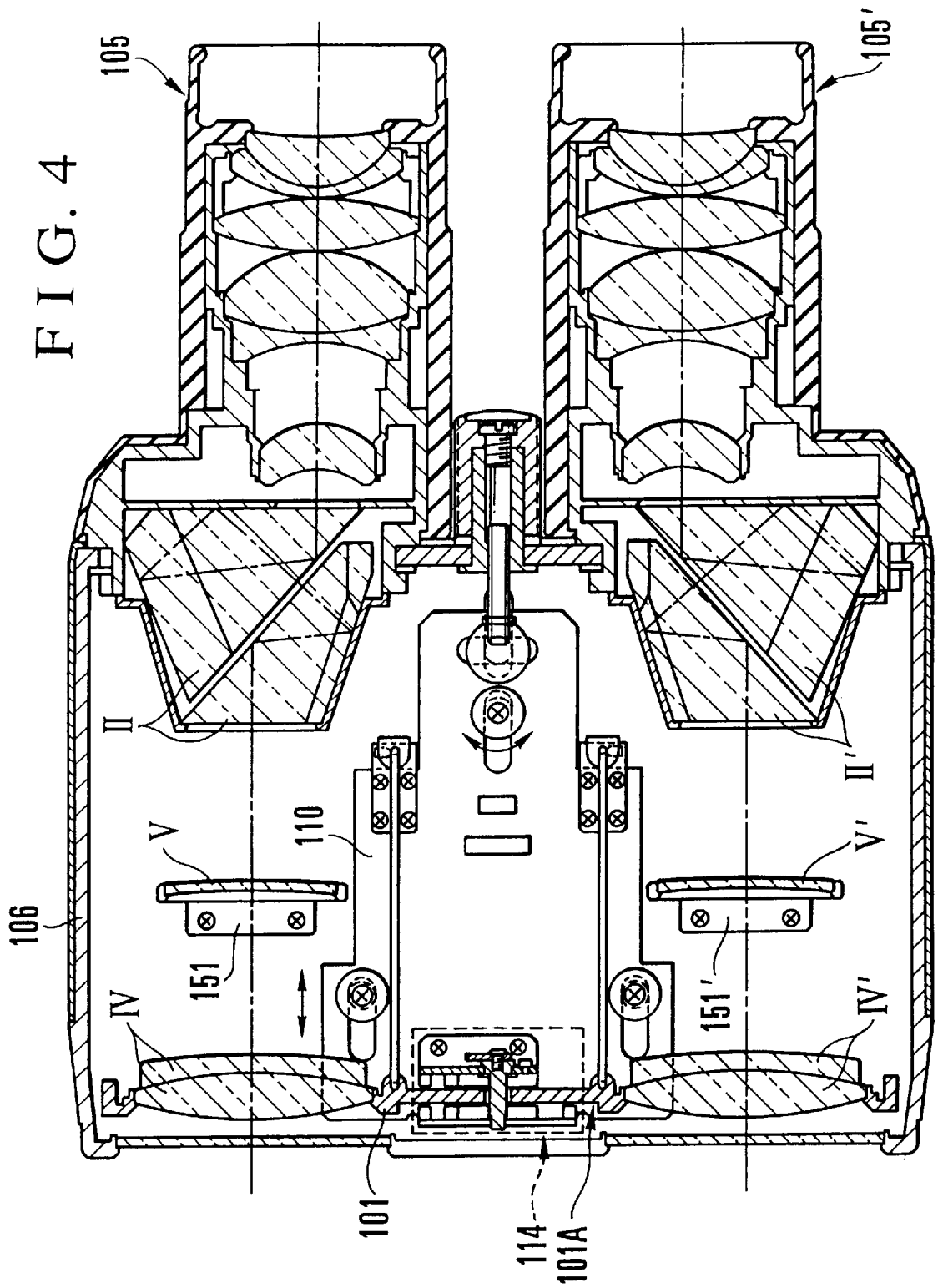

BINOCULAR

BACKGROUND OF THE INVENTION

1. Field of the Invention

The present invention relates to an optical apparatus for observing, with a pair of right and left ocular optical systems (eyepieces), images formed by a pair of right and left objective optical systems (objective lenses), and more particularly to an optical apparatus such as a binocular arranged to correct shaking of the observed images during the holding of the optical apparatus by correctively shifting on a focal plane the images formed by the pair of right and left objective optical systems.

2. Description of Related Art

Heretofore, there have been proposed binoculars of the kind arranged to be capable of correcting shaking of observed images caused by the vibration of holding hands, for example, as follows.

(i) Prism binoculars each arranged to correct shaking of observed images during the holding of the binocular by correctively rotating the whole or a part of an erecting optical system including a prism, a mirror or the like with respect to a fixed body part of the binocular in such a way as to shift focusing images (Japanese Laid-Open Patent Applications No. SHO 54-23554 and No. HEI 2-284113).

(ii) A binocular in which a prism having a vertical-angle varying function is disposed closer to the object than the focal plane of each of objective lenses of the right and left lens barrels rotatably interconnected to each other, and the angle of reflection or the angle of refraction in such a prism is correctively varied so as to correct shaking of observed images during the holding of the binocular (Japanese Laid-Open Patent Application No. HEI 7-84223).

Of the binoculars having the erecting optical system correctively rotated as mentioned in Paragraph (i) above, the binocular proposed in Japanese Laid-Open Patent Application No. SHO 54-23554 is arranged to integrally swing a pair of right and left prisms serving as the erecting optical system with respect to the fixed body part of the binocular. This arrangement, therefore, necessitates a large structure for supporting the prisms and is thus hardly suited for a compact binocular. Further, the binocular proposed in Japanese Laid-Open Patent Application No. HEI 2-284113 is arranged to use a part of a mirror serving as the erecting optical system in common for the right and left systems and to drive and decenter the part of the mirror. This arrangement has an advantage in that a pair of light fluxes passing through a pair of objective optical systems can be simultaneously deflected and controlled, but has a shortcoming in that there is required a prism exclusively used for adjustment of an interpupillary distance. Further, both of these binoculars necessitate inclusion of erecting optical systems such as prisms as indispensable components and, therefore, the arrangements of them cannot be applied to some binoculars having no erecting optical system, such as a Galilean binocular.

On the other hand, the binocular proposed in Japanese Laid-Open Patent Application No. HEI 7-84223 necessitates addition of a separate optical part (a prism having the vertical-angle varying function) for shifting a focusing image by bending the optical axis to each of the right and left optical systems constituting the binocular. The additional optical part has presented a problem in respect of cost and size. Besides, since the right and left lens barrels are rotatably interconnected, it is necessary to pay attention to the adjustment of right and left optical axes.

BRIEF SUMMARY OF THE INVENTION

The invention has been developed in view of the above-stated problems of the prior-proposed binoculars. It is, therefore, an object of the invention to provide an optical apparatus which is arranged to permit correction of shaking of observed images during the holding of the optical apparatus, to be capable of keeping the right and left optical axes in an adequate parallel relation over a long period of time without necessitating any troublesome adjustment of the right and left optical axes, and yet to permit reduction in cost and size of the optical apparatus.

To attain the above object, in accordance with an aspect of the invention, there is provided a binocular, which comprises a pair of objective lenses which respectively have optical axes, a pair of eyepieces for observing images formed by the pair of objective lenses, and driving means for integrally driving and decentering at least respective parts of the pair of objective lenses with respect to the optical axes.

In particular, the binocular further comprises a connection member which interconnects the respective parts of the pair of objective lenses, and the driving means is arranged to drive the connection member.

Further, the driving means is disposed approximately in a middle position between the pair of objective lenses.

The above and other objects and features of the invention will become apparent from the following detailed description of embodiments thereof taken in connection with the accompanying drawings.

BRIEF DESCRIPTION OF THE SEVERAL VIEWS OF THE DRAWING

FIG. 4 is a horizontal sectional view showing a prism binocular arranged as an optical apparatus according to a second embodiment of the invention.

DETAILED DESCRIPTION OF THE INVENTION

Hereinafter, preferred embodiments of the invention will be described in detail with reference to the accompanying drawings. Although in the embodiments shown in the accompanying drawings there are illustrated, by way of example, prism binoculars using erecting prisms, the invention is applicable not only to binoculars using erecting prisms but also to optical apparatuses of other types, such as a so-called Galilean binocular having a pair of right and left objective optical systems (hereinafter referred to as objective lenses) and a pair of ocular optical systems (hereinafter referred to as eyepieces).

Figure 1:
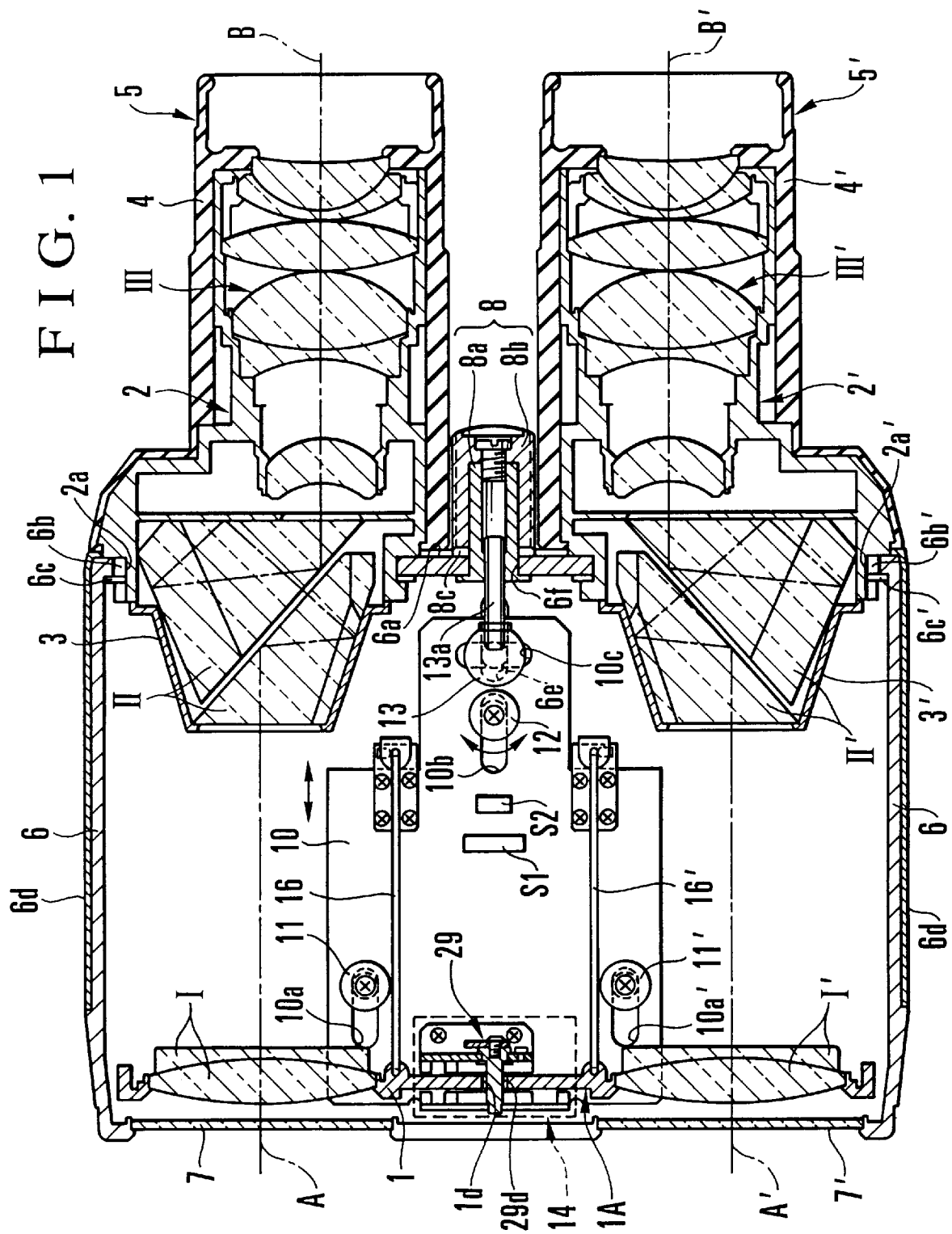
FIG. 1 is a horizontal sectional view showing a prism binocular arranged as an optical apparatus according to a first embodiment of the invention.
Figure 2A:
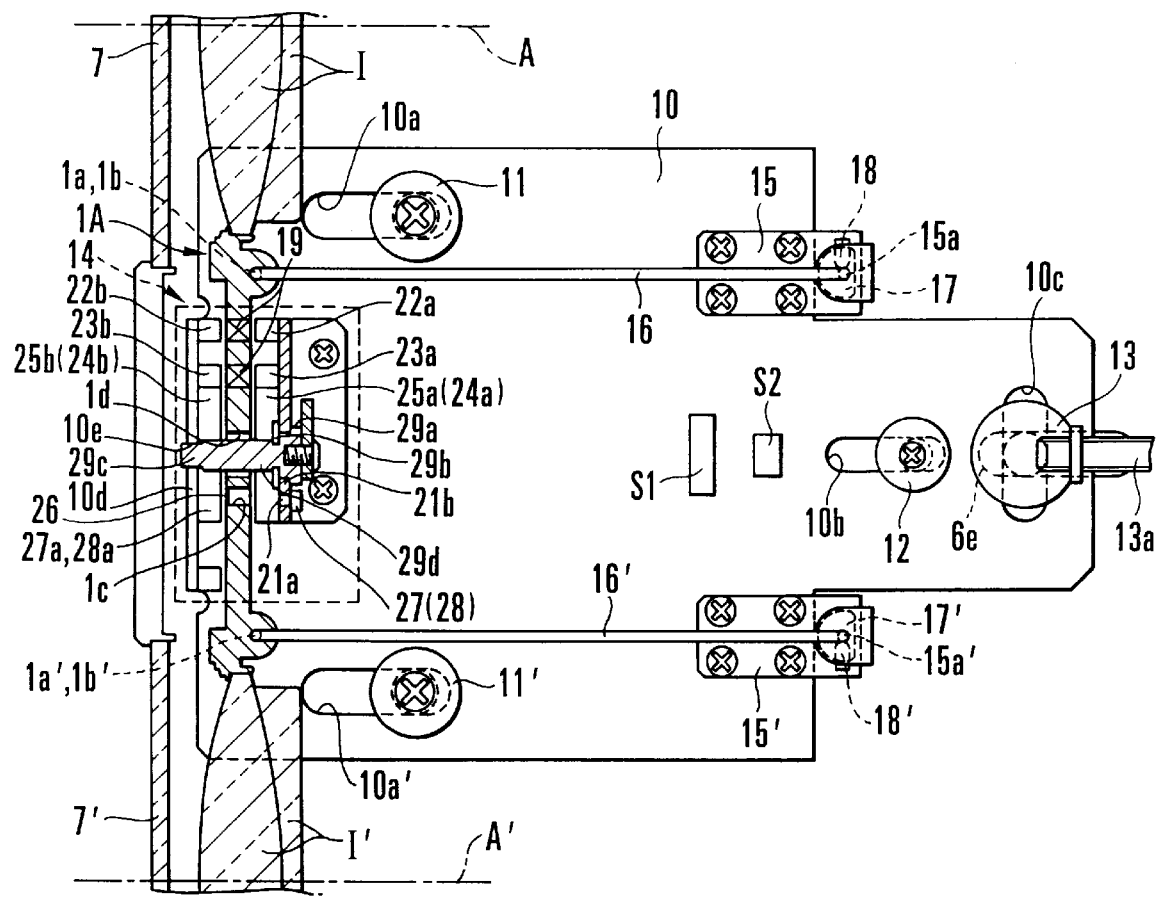
FIG. 2A is an enlarged view showing essential parts of a front lens group unit of the prism binocular shown in FIG. 1.
Figure 2B:
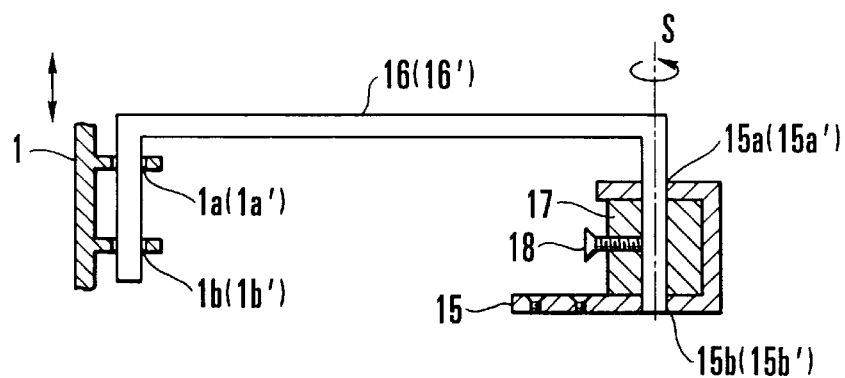
FIG. 2B is an enlarged view of a part of FIG. 2A.
Figure 3A:
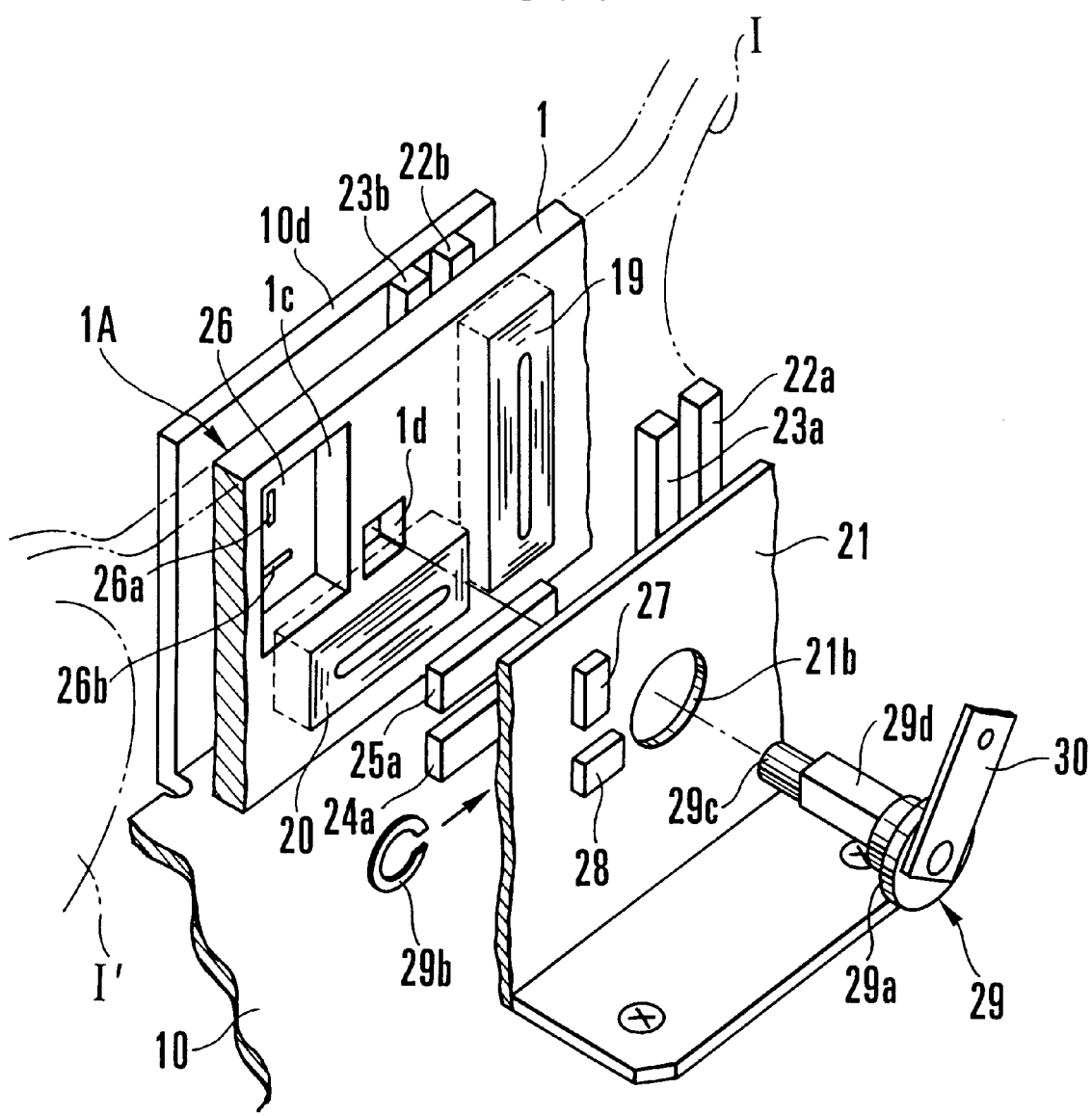
FIG. 3A is an exploded perspective view showing essential parts of a driving portion of the prism binocular shown in FIG. 1.
Figure 3B:
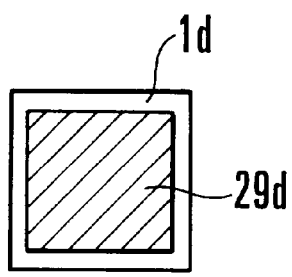
FIG. 3B is an enlarged view of a part of FIG. 3A.

In the drawings, FIG. 1 is a horizontal sectional view showing a prism binocular according to a first embodiment of the invention, FIG. 2A is an enlarged view showing essential parts of a front lens group unit of the prism binocular shown in FIG. 1, FIG. 2B is an enlarged view showing a part of FIG. 2A, FIG. 3A is an enlarged view showing essential parts of a driving portion of the prism binocular shown in FIG. 1, and FIG. 3B is an enlarged view showing a part of FIG. 3A.

Referring to FIG. 1, reference characters I and I' denote a pair of right and left objective lenses, reference characters II and II' denote a pair of right and left erecting prisms, and reference characters III and III' denote a pair of right and left eyepieces. These optical parts constitute an optical system of the prism binocular according to the first embodiment.

The objective lenses I and I' respectively have a pair of right and left optical axes A and A' extending in parallel to each other, and are integrally fitted in a lens frame 1, as shown in FIG. 1, constituting an objective optical system unit 1A in conjunction with the lens frame 1. The erecting prisms II and II' are respectively fixed by holding members 3 and 3' to rear lens group barrels 2 and 2', as shown in FIG. 1. The eyepieces III and III' are caused by the erecting prisms II and II' to be not coaxial with the optical axes A and A' of the objective lenses I and I', thereby respectively having a pair of right and left optical axes B and B' extending in parallel to each other, and are held by the rear lens group barrels 2 and 2', respectively.

Rubber covers 4 and 4' are arranged to cover the exterior parts of the rear lens group barrels 2 and 2', respectively. The rear lens group barrels 2 and 2' are respectively provided with bayonet fitting slide parts 2a and 2a'. The erecting prisms II and II', the rear lens group barrels 2 and 2', the holding members 3 and 3', the eyepieces III and III' and the rubber covers 4 and 4' are respectively made into one united body, thereby constituting rear lens group barrel units 5 and 5', respectively.

In FIG. 1, reference numeral 6 denotes a binocular body. At a rear end face 6a of the binocular body 6, there are provided with bayonet sliding holes 6b and 6b' which have their centers coincident with the optical axes A and A' of the objective lenses I and I', respectively. The bayonet fitting slide parts 2a and 2a' of the rear lens group barrels 2 and 2' are fitted and inserted into the bayonet sliding holes 6b and 6b', respectively. Stoppers 6c and 6c' are arranged to respectively hold the rear lens group barrel units 5 and 5' in such a way as to allow the rear lens group barrel units 5 and 5' to be rotatable around the optical axes A and A' relative to the binocular body 6. Further, the rear lens group barrel units 5 and 5' are made by an interlocking mechanism (not shown) to be rotatable in the directions opposite to each other around the optical axes A and A' of the objective lenses I and I', respectively. The angles of rotation of the rear lens group barrel units 5 and 5' around the optical axes A and A' are limited to allow the width of a space between the optical axes B and B' of the eyepieces III and III' to be adjustable within a predetermined range.

A pair of right and left protection glass pieces 7 and 7' the centers of which coincide respectively with the directions of the optical axes A and A' of the objective lenses I and I' are securely fixed to the front surface part of the binocular body 6 (on one side of the lens frame 1 opposite to the side on which the eyepieces III and III' are located). The protection glass pieces 7 and 7' serve to have the objective optical system unit 1A sealed up within the binocular body 6 and give water-proof and dust-proof effects on the objective optical system unit 1A.

A focus adjusting knob 8 (focus adjusting means) which is arranged to be rotatable in a fixed position as will be described later is disposed in the middle part of the rear end face 6a of the binocular body 6. A protection cover 6d is securely fixed to a side face part of the binocular body 6.

In FIG. 1, reference numeral 10 denotes a front lens group unit body. The front lens group unit body 10 is provided with rectilinear motion slots 10a and 10a' which are formed in two right and left symmetric front parts to extend in the direction of the optical axes A and A' of the objective lenses I and I', as shown in FIGS. 1 and 2A. In rear of the two rectilinear motion slots 10a and 10a', there is a rectilinear motion slot 10b which is formed in the middle part of the front lens group unit body 10 to extend also in the direction of the optical axes A and A'. Another rectilinear motion slot 10c is formed in the middle part of the front lens group unit body 10 and in rear of the slot 10b to extend in the direction perpendicular to the direction of the optical axes A and A' of the objective lenses I and I'.

Stepped rollers 11 and 11' respectively engage the two rectilinear motion slots 10a and 10a' at their smaller diameter parts. The stepped rollers 11 and 11' are fixed to the binocular body 6 with screws. Coiled springs (not shown) are fastened to the binocular body 6 with the screws, using the stepped rollers 11 and 11' as shafts for the coiled springs. Thus, the front lens group unit body 10 is kept in a state of being constantly pushed against the binocular body 6 by the force of the coiled springs.

A rectilinear motion guide mechanism is formed in the manner as described above. The front lens group body unit 10 (slide member) which is mounted on the binocular body 6 via the rectilinear motion guide mechanism is arranged to be movable back and forth (in the direction of the optical axes A and A' of the objective lenses I and II) in the state of being pushed against the binocular body 6 and being guided, with the smaller diameter parts of the right and left stepped rollers 11 and 11' serving as datum points, by the two rectilinear motion slots 10a and 10a' which engage the stepped rollers 11 and 11' and are formed in right and left symmetric front parts of the front lens group unit body 10. Further, since the two rectilinear motion slots 10a and 10a' are disposed at right and left symmetric positions of the front part of the front lens group unit body 10, the front lens group unit body 10 is arranged to be swingable to a very short extent in the right and left directions (in horizontal directions including the optical axes A and A' of the objective lenses I and I') within the range of a slight engagement play of t he small diameter parts of the stepped rollers 11 and 11' in the two rectilinear motion slots 10a and 10a'.

As shown in FIGS. 1 and 2A, a smaller diameter part of a stepped eccentric roller 12 which is employed as an eccentric member engages the rectilinear motion slot 10b formed in the rear middle part of the front lens group unit body 10. A coiled spring which is not shown but is provided for charging is connected to the binocular body 6 by a screw together with the roller 12 as in the case of the above-stated rectilinear motion guide mechanism. In the case of the rectilinear motion slot 10b, however, the stepped eccentric roller 12 is connected, for example, by a half-tightening tapping screw or the like to he rotatable to a slight degree and is not completely fixed to the binocular body 6. In addition, the roller 12 is set in such a way as to have its smaller diameter part (an eccentric shaft) somewhat decentered, with respect to its larger diameter part, to be in an eccentric state deviating a little from the center of a screw hole which is coaxial with the roller 12 and extends perpendicular to the horizontal direction including the optical axes A and A' of the objective lenses I and I'. The stepped eccentric roller 12 is connected by a connection member (not shown) to a diopter correction knob (diopter correction means) which is not shown but is arranged to be rotatable within a predetermined range from outside.

The front lens group unit body 10 mounted on the binocular body 6 through a swing guide mechanism which is arranged as described above is swung in the horizontal direction including the optical axes A and A' of the objective lenses I and I' when the diopter correction knob (not shown) is operated to turn. The objective lenses I and I' are then swung a little also in the horizontal direction including the optical axes A and A'. The diopters of the right and left objective lenses I and I' thus can be adjusted to each other by this operation.

A small diameter part of a focus adjusting stepped roller 13 engages the rectilinear motion slot 10c of the front lens group unit body 10 and extends further to engage also a longitudinal groove 6e of the binocular body 6. A screw rod 13a which extends rearward at a right angle with the roller shaft is firmly screwed to a larger diameter part of the focus adjusting stepped roller 13. The screw rod 13a is screwed also to the focus adjusting knob 8 which is set to be rotatable in a fixed position, as shown in FIG. 1. The front lens group unit body 10 can be moved in the direction of the optical axes A and A' by rotatively operating an exterior member 8b of the focus adjusting knob 8 in such a way as to vary the amount of screwing the screw rod 13a into the focus adjusting knob 8. With the front lens group unit body 10 moved in this manner, a driving unit including the objective lenses I and I' is also moved in its entirety in the direction of the optical axes A and A'.

The details of the structural arrangement of the focus adjusting knob 8 which is rotatable in a fixed position are as follows. As shown in Figs. 1 and 2A, a flanged nut 8a of the focus adjusting knob 8 engages a hole 6f provided in the binocular body 6. With the flange of the flanged nut 8a set on the inner side, an outward protruding part of the flanged nut 8a is covered with the exterior member 8b through a buffer member 8c. Then, the exterior member 8b is secured in position by screwing from behind a screw in such a way as to pull the flanged nut 8a inward. Thus, the focus adjusting knob 8 is mounted on the rear end face 6a of the binocular body 6 in a state of not only being rotatable in a fixed position but also having some friction. A tap is provided in the front middle part of the flanged nut 8a. The above-stated screw rod 13a is screwed to the tap. The amount of screwing the screw rod 13a into the focus adjusting knob 8 is variable by turning the exterior member 8b, so that the entirety of the front lens group unit body 10 can be moved in the direction of the optical axes A and A' by operating the exterior member 8b of the focus adjusting knob 8.

A driving portion of an image stabilizing means and an attitude control means are next described with reference to FIGS. 2A and 2B. In FIG. 2A, reference numeral 14 denotes the driving portion of the image stabilizing means. The objective optical system unit 1A which is composed of the lens frame 1 and the objective lenses I and I' held by the lens frame 1 can be moved relative to the front lens group unit body 10 laterally and vertically in directions perpendicular to the optical axes A and A' by means of the driving portion 14. The lens frame 1 is provided with holes 1a and 1b which are formed in a pair of protruding pieces spaced in the direction of height (in the vertical direction) and holes 1a' and 1b' which are arranged in positions right-and-left symmetric to the holes 1a and 1b in the same manner as the holes 1a and 1b, as shown in FIG. 2B. The front lens group unit body 10 is provided with a pair of right and left attitude retaining bases 15 and 15' each of which is U-shaped as viewed in a horizontal sectional view and which have holes 15a, 15b, 15a' and 15b' formed therein in positions laterally and vertically spaced to correspond to the holes 1a, 1b, 1a' and 1b' formed in the lens frame 1. The attitude retaining bases 15 and 15' are secured respectively to upper and lower faces of the front lens group unit body 10 with screws.

Rectangular bent parts at both ends of a pair of elastic deformable attitude retaining rods 16 and 16' which extend in parallel to the optical axes A and A' of the objective lenses I and I' are inserted into the holes 1a, 1b, 1a' and 1b' formed in the lens frame 1 and the holes 15a, 15b, 15a' and 15b' formed in the attitude retaining bases 15 and 15'.

Spacers 17 and 17' are fitted and inserted in between the upper and lower faces of the attitude retaining bases 15 and 15', and the rectangular bent parts of the attitude retaining rods 16 and 16' pierce through the spacers 17 and 17', respectively. One end of each of the attitude retaining rods 16 and 16' is secured to each of the attitude retaining bases 15 and 15' with a set screw 18 or 18' screwed into the spacer 17 or 17'.

The attitude retaining rods 16 and 16' are thus arranged to be swung by elastically deforming in the horizontal direction around the holes 15a, 15a', 15b and 15b' of the attitude retaining bases 15 and 15' while the vertical plays of the attitude retaining rods 16 and 16' are being restricted.

The vertical length of the other end of each of the attitude retaining rods 16 and 16' piercing through the holes 1a and 1b or 1a' and 1b' provided in the lens frame 1 is arranged to be a little longer than a distance between the holes 1a and 1b or 1a' and 1b', in such a way as to make the objective optical system unit 1A movable in the vertical direction orthogonally intersecting the optical axis A or A' of the objective lens I or I', so that the objective optical system unit 1A can be prevented from coming off even when the lens frame 1 happens to move somewhat in this direction.

Therefore, the lens frame 1 of the objective optical system unit 1A connected to the front lens group unit body 10 is movable, by the attitude control means which is arranged as described above, in such a way as to slide the holes 1a, 1b, 1a' and 1b' provided in the lens frame 1 in the direction orthogonally intersecting the optical axes A and A' of the objective lenses I and I' (vertical direction as viewed in FIG. 2B). Further, on a plane including the direction of the optical axes A and A', the lens frame 1 is swingable at about a right angle with the optical axes A and A' on a locus of a radius equal to the length of the attitude retaining rods 16 and 16', as indicated by an arrow S in FIG. 2B and yet can be retained in an attitude or posture at a right angle with respect to the optical axes A and A'. The lenses are thus arranged to be drivable in vertical and lateral directions by means of the driving unit.

The driving portion 14 of the image stabilizing means is described in further detail with reference to FIGS. 2A and 3A as follows. referring to FIGS. 2A and 3A, a driving coil 19 is provided for driving in the direction of yaw and a driving coil 20 is provided for driving in the direction of pitch. The yaw-direction driving coil 19 and the pitch-direction driving coil 20 are buried in the lens frame 1, as shown in FIG. 3A. The lens frame 1 is arranged to interconnect in part the pair of objective lenses I and I' with each other.

A holding plate 21 is arranged to have yaw-direction magnets 22a and 23a attached to its surface on the side of the lens frame 1 in positions confronting right and left winding parts of the yaw-direction driving coil 19. The holding plate 21 is disposed in a position where the lens frame 1 is freely movable and is secured with screws to the front lens group unit body 10. Other yaw-direction magnets 22b and 23b are secured to a holding piece 10d, which is opposed to the holding plate 21 and is disposed on a front part of the front lens group unit body 10, in positions corresponding to the magnets 22a and 23a in such a way as to have the right and left winding parts of the yaw-direction driving coil 19 sandwiched in between them. The magnets 22a and 23a which are provided on the holding plate 21 are magnetized in the direction of the optical axis (forward, for example). The magnets 22b and 23b which are provided on the holding piece 10d of the front lens group unit body 10 are magnetized in a direction deviating 180 degrees from the magnetizing direction of the magnets 22a and 23a (rearward, for example).

Magnets 24a, 24b, 25a and 25b for the direction of pitch are also arranged in combination, according to the position of the pitch-direction driving coil 20, in the same manner as the above-mentioned yaw-direction magnets. In other words, the magnets 24a and 25a are attached to the surface of the holding plate 21 on the side of the lens frame 1. The other magnets 24b and 25b for the pitch direction are secured to the holding piece 10d of the front lens group unit body 10 in positions corresponding to the magnets 24a and 25a and arranged in such a way as to have the upper and lower winding parts of the pitch-direction driving coil 20 sandwiched in between these magnets. The magnets 24a and 25a which are provided on the holding plate 21 are magnetized in the direction of the optical axis (forward, for example). The magnets 24b and 25b which are provided on the front lens group unit body 10 are magnetized in a direction deviating 180 degrees from the magnetizing direction of the magnets 24a and 25a (rearward, for example).

Lead wires (not shown) which are pulled out from both ends of the above-stated driving coils 19 and 20 are connected toadriving circuit (not shown). The driving circuit is controlled by a control circuit (not shown). In FIGS. 2A and 3A, reference numeral 26 denotes a mask. The mask 26 is attached to the lens frame 1 in such a manner as to cover and close an aperture window 1c provided in the lens frame 1. As shown in FIG. 3A, the mask 26 is provided with a vertical slit 26a which is arranged to let infrared light pass there for detecting a position in the direction of yaw and a horizontal slit 26b which is arranged to let infrared light pass there for detecting a position in the direction of pitch. Light emitting elements 27 and 28 which are IREDs or the like are arranged to emit the infrared light for detecting the positions in the directions of yaw and pitch, respectively. Light receiving elements 27a and 28a which are PSDs or the like are arranged to vary their outputs according to positions where they receive the infrared light from the light emitting elements 27 and 28. The light emitting elements 27 and 28 illuminate the slits 26a and 26b with the infrared light through through-holes 21a provided in the holding plate 21. The portions of infrared light passing through the detecting slits 26a and 26b are respectively received by the light receiving elements 27a and 28a. With the light emitting elements 27 and 28, the mask 26 and the light receiving elements 27a and 28a arranged in combination, there is provided a two-dimensional position detecting mechanism which is capable of detecting the position of the lens frame 1 of the objective optical unit 1A with respect to the front lens group unit body 10 and the positions of the objective lenses I and I' with respect to the front lens group unit body 10 in the vertical direction which is orthogonally intersecting the optical axes A and A' of the objective lenses I and I' and in the horizontal direction. Position detection signals obtained from the two-dimensional position detecting mechanism are supplied to the above-mentioned control circuit and processed there.

Movement suppressing means is next described with reference to FIGS. 2A and 3A as follows. In FIGS. 2A and 3A, reference numeral 29 denotes a center lock pin serving as a lock member constituting the movement suppressing means. The center lock pin 29 is disposed approximately in a middle position between the optical axes A and A' of the objective lenses I and I'. The center lock pin 29 is rotatably fitted in a hole 21b formed in the holding plate 21 and is held at the hole 21b by a flange part 29a and a washer 29b. A fore end part 29c of the center lock pin 29 is in a cylindrical shape and is arranged to be fitted also in a hole 10e which is formed in the holding piece 10d of the front lens group unit body 10. The center lock pin 29 thus has a sufficient strength in the lateral (diametral) direction.

An intermediate part (lock part) 29d of the center lock pin 29 is formed in a polygonal cylindrical shape (in a square cylindrical shape in the case of the first embodiment), as shown in FIG. 3B, and pierces through a through-hole 1d (square hole in the case of the first embodiment) which is formed approximately in the center of the lens frame 1 in a shape similar to but a little larger than the intermediate part 29d of the center lock pin 29. The intermediate part (lock part) 29d of the center lock pin 29 is arranged to be locked to the through-hole 1d when the center lock pin 29 is turned.

When the intermediate part 29d and the through-hole 1d are in an unlocked state in which each side of the intermediate part 29d is in parallel to the corresponding side of the through-hole 1d in the direction of diameter, as shown in FIG. 3B, the center lock pin 29 is movable as much as an amount of clearance obtained on each side thereof in the direction of orthogonally intersecting the optical axes A and A', i.e., in vertical and lateral directions, in the case of the first embodiment. The objective optical system unit 1A can be locked to be immovable by turning the center lock pin 29 a predetermined degree of angle from the unlocked state (45 degrees in the case of the first embodiment) to bring each angular part of the intermediate part 29d into contact with each side of the through-hole 1d.

A lever 30 is obliquely screwed to the flange part 29a of the center lock pin 29. In using the image stabilizing function of the image stabilizing means, the lever 30 is operated to unlock the objective optical system unit 1A to be movable. When the image stabilizing function of the image stabilizing means is not used, or in stowing the binocular, the lever 30 is operated for a locked state to make the objective optical system unit 1A immovable. For the locking and unlocking actions, the lever 30 is interlocked with an image-stabilizing-function on-off switch and a power supply switch which are not shown.

Shaking of the binocular is detected, for example, by a vibration gyro-sensor S1 for detection of pitching and a vibration gyro-sensor S2 for detection of yawing. The gyro-sensors S1 and S2 are arranged in some suitable places on the front lens group unit body 10 and are connected to the control circuit (not shown) to supply shake detection signals to the control circuit.

Next, operation of the prism binocular according to the first embodiment will be described. When the image stabilizing function on-off switch (not shown) is turned on for use of the image stabilizing function, the power supply switch is turned on to render the control circuit (not shown) and the driving circuit (not shown) operative. The center lock pin 29 then rotates a predetermined degree of angle to unlock and make the objective optical system unit 1A movable. The objective optical system unit 1A is thus freed from mechanical restriction imposed by the movement suppressing means with respect to the front lens group unit body 10.

With the objective optical system unit 1A thus unlocked, the control circuit (not shown) decides an optimum amount of driving for offsetting the shaking of the binocular by computing the amount of deviation of the lens frame 1 of the objective optical system unit 1A relative to the front lens group unit body 10 on the basis of position detection signals obtained from the above-stated two-dimensional position detecting mechanism and according to shake detection signals indicating deviations detected by the pitching and yawing vibration gyro-sensors S1 and S2 during the holding of the binocular for observing images. A driving signal thus obtained by the control circuit is supplied to the driving circuit. The driving circuit then causes currents corresponding to the driving amount indicated by the driving signal to flow to the yaw-direction driving coil 19 and the pitch-direction driving coil 20. By this, the objective optical system unit 1A, i.e., the lens frame 1 and the objective lenses I and I', perform an image stabilizing action on the front lens group unit body 10 and also on the binocular body 6 in conjunction with an electromagnetic force based on the Fleming's left hand rule.

As described above, the rotating action of the center lock pin 29 causes the objective optical system unit 1A to be integrated with the front lens group unit body 10 about at a middle part of the lens frame 1 at least when the objective optical system unit 1A is locked. When being unlocked, however, the objective optical system unit 1A is vertically moved by its weight in the direction of orthogonally intersecting the optical axes A and A' of the objective lenses I and I'. Therefore, any deviation taking place from a focal plane in the direction of the optical axes A and A' when the objective optical system unit 1A is locked can be disregarded. The focus of the prism binocular thus can be adjusted by turning the focus adjusting knob 8 to shift the whole front lens group unit body 10 in the direction of the optical axes A and A' of the objective lenses I and I'. Further, focusing images obtained by the right and left objective lenses I and I' can be slightly swung in opposite directions, for the right and left eyes, by turning the diopter correction knob (not shown) to cause the stepped eccentric roller 12 to rotate and thus to shift the whole objective optical system unit 1A to a very small amount in the horizontal direction including the optical axes A and A' of the objective lenses I and I'. Further, the right and left diopters also can be adjusted by using the diopter correction knob together with the focus adjusting knob 8.

A prism binocular according to a second embodiment of the invention differs from the prism binocular described above as the first embodiment only in respect of the optical system of the objective lenses I and I'. Except for the optical system, all other parts of the second embodiment are arranged in the same manner as in the first embodiment. While each of the objective lenses I and I' in the first embodiment is composed of one lens group, each of the objective lenses in the second embodiment is composed of two lens groups, i.e., a lens group IV or IV' and another lens group V or V'. Parts of the objective lenses to be moved for correction of shaking are the lens groups IV and IV'. The following description covers only a portion where the second embodiment differs from the arrangement of the first embodiment.

FIG. 4 shows in a horizontal sectional view the prism binocular according to the second embodiment. Rear lens group barrel units 105 and 105' and a driving portion 114 are arranged in exactly the same manner as in the case of the first embodiment.

In FIG. 4, reference numeral 101A denotes an objective optical system unit. Reference numeral 101 denotes a lens frame of the objective optical system unit 101A. Since the objective lenses IV and IV' which are arranged to be moved differ in shape from the objective lenses I and I' which are arranged to be moved in the first embodiment, the lens holding part of the lens frame 101 somewhat differs in shape from that of the lens frame 1 in the first embodiment. Except for this point, the lens frame 101 is arranged in the same manner as the lens frame 1. A front lens group unit body 110 which has the objective optical system unit 101A mounted thereon including the objective lenses IV and IV' is also arranged to function in the same manner as the front lens group unit body 10 in the first embodiment. Therefore, the focus adjusting means, the diopter correcting means and the attitude control means of the second embodiment are arranged to function in exactly the same manner as those of the first embodiment described in the foregoing.

The objective lenses V and V' which are not to be moved are respectively held by fixed frames 151 and 151' disposed between the objective optical system unit 101A and erecting prisms II and II'. The fixed frames 151 and 151' are secured to predetermined parts of a binocular body 106 with screws, as shown in FIG. 4. The front lens group unit body 110 is arranged similarly to the front lens group unit body 10 in the first embodiment except in the escape shape of parts where the immovable objective lenses V and V' are mounted.

As mentioned above, with the objective lenses arranged to include a plurality of lens groups, some of the objective lenses are immovably secured to the binocular body 106 and the remaining objective lenses are arranged to be vertically and laterally movable for correction of shaking.

A prism binocular according to a third embodiment of the invention uses the same optical system as that of the prism binocular in the second embodiment. However, the third embodiment differs from the second embodiment in that the lenses V and V' among the objective lens groups are fixed to a front lens group unit body 210. The following description covers only a part where the third embodiment differs from the first embodiment.

Figure 5:
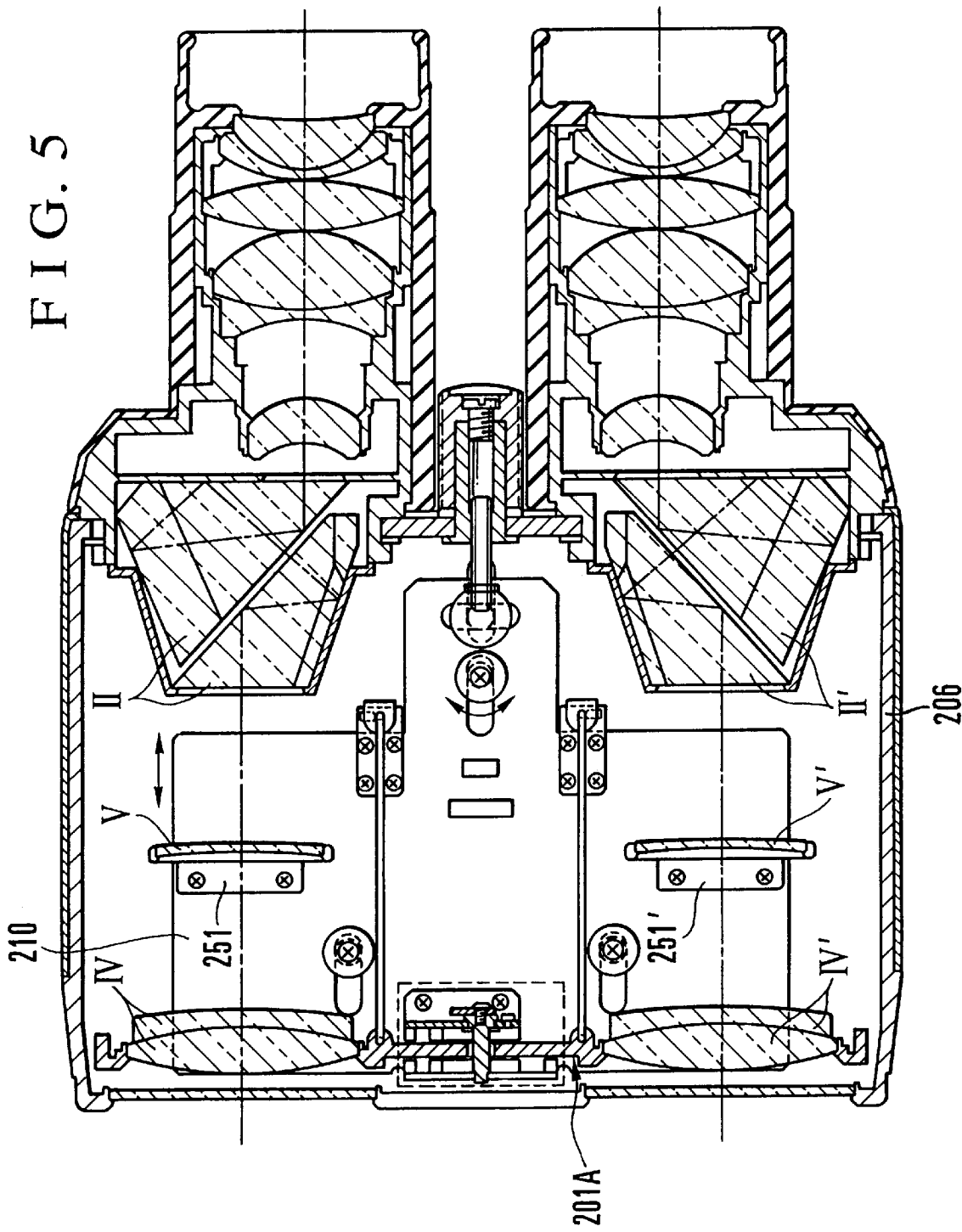
FIG. 5 is a horizontal sectional view showing a prism binocular arranged as an optical apparatus according to a third embodiment of the invention.

FIG. 5 is a horizontal sectional view showing the prism binocular according to the third embodiment. The objective lenses V and V' are respectively held by fixed frames 251 and 251', which are fixed with screws in predetermined positions between an objective optical system unit 201A and erecting prisms II and II' in a manner as shown in FIG. 5. Therefore, unlike in the second embodiment, the mounting positions of the fixed frames 251 and 251' are arranged to be shifted a little forward or rearward in the direction of the optical axes A and A' of the objective lens groups IV and IV' which are to be moved for correction of shaking. Further, the parts of the front lens group unit body 210 where the objective lenses V and V' are mounted thereon somewhat differ in shape from the corresponding parts of the front lens group unit body 110 in the second embodiment. With the exception of these points, the front lens group unit body 210 is arranged to function in the same manner as the front lens group unit body 110 in the second embodiment. Therefore, the focus adjusting means, the diopter correcting means and the attitude control means of the third embodiment function in exactly the same manner as those of the first embodiment. Since the optical system which acts integrally with the front lens group unit body 210 is arranged differently from that of the second embodiment, a lens moving amount for focus adjustment and a front lens group unit rotating amount for diopter correction in the third embodiment differ from those in the second embodiment.

As described above, with the objective lenses arranged to include a plurality of lens groups, some of the objective lenses are fixed to the front lens group unit body 210 while the remaining objective lenses are arranged to be used for correction of shaking.

As described above, in the prism binoculars according to the embodiments of the invention, the objective optical system unit is provided with a common lens frame for moving the pair of right and left objective lenses together in the direction of orthogonally intersecting the optical axes. A driving portion of the image stabilizing means for driving the objective optical system unit is disposed between the right and left objective lenses. The image stabilizing means is thus arranged to correct shaking during the holding of the optical apparatus (the binocular) for observing images. The objective optical system unit and the driving portion of the image stabilizing means are unitized into a front lens group unit. Focus is adjusted by moving the front lens group unit in the direction of the optical axes of the right and left objective lenses. The right and left diopters are corrected by swinging the front lens group unit on a plane including the right and left optical axes. A protection glass piece is disposed in front of each of the right and left objective lenses.

In the prism binocular arranged in the above-stated manner, shaking during the holding of the binocular is corrected by using the objective lenses. The shake correcting objective lenses are arranged in one unit. The position of the shake correcting objective lenses is arranged to be vertically or horizontally shiftable in the direction of orthogonally intersecting the optical axes. By virtue of the arrangement, the shake correcting action can be carried out without any large driving force even where the lenses to be driven are heavy. A battery employed as energy supply means thus can be allowed to be compact in size and to have a longer service life.

Further, since the optical system can be formed solely by a fundamental optical system as a binocular (including objective lenses and eyepieces), the arrangement disclosed dispenses with any erecting optical system such as prisms, mirrors, etc., for reduction in cost. Besides, according to the arrangement, the right and left optical axes can be simply adjusted, degradation with time takes place to a less degree, and maintenance work can be easily carried out.

The driving portion for driving the objective optical system unit is disposed in the middle part of the objective optical system unit which unifies into one body the right and left shake correcting systems for correcting shaking during the holding of the binocular. The position of the driving portion permits simplification of arrangement and structure of parts and reduction in cost and size.

Further, since at least the objective optical system unit and the driving portion which drives the objective optical system unit are unified as a front lens group unit, a shake-correcting mechanism which is required to have a high degree of precision is arranged in a unified state to ensure stability. The arrangement for making the front lens group unit movable in the direction of the optical axes and also in the horizontal direction including the optical axes facilitates focus adjustment and diopter correction. The arrangement for adjusting focus by moving the front lens group unit in the direction of the optical axes allows the outside shape of the whole binocular to remain unvarying while a focus adjusting operation is in process. When the binocular is in use, therefore, it never comes out of focus even if the eyepiece barrel parts are pushed against the eyes or glasses. That arrangement thus gives a good feeling of use.

The front lens group unit is arranged to be swung on a plane including the right and left optical axes, that is, to be swung horizontally around the right and left optical axes, for correcting the right and left diopters. Therefore, the diopter correction will never be caused to deviate by pushing the diopter correcting lens barrel parts against the eyes or by inadvertently touching the diopter correcting parts. The binocular gives a good feeling of use also in this respect.

Further, the protection glass pieces disposed on the optical axes in front of the objective lenses give water-proof and dust-proof effects and thus also give a good feeling of use.

In the optical apparatus, i.e., the binocular, according to the invention, as described above, the objective optical system unit includes a pair of right and left objective optical systems arranged in one unified body to be movable in the direction orthogonally intersecting the optical axes of the two objective optical systems, shaking of the optical apparatus in observing images is detected, and the objective optical system unit is moved in such a direction as to cancel the detected shaking. This arrangement not only obviates the necessity of a troublesome adjusting operation on the right and left optical axes but also effectively corrects the shaking of images being observed, while the right and left optical axes are kept in an adequate parallel relation over a long period of time.

Further, as mentioned above, the optical system of the optical apparatus (binocular) according to the invention can be composed of only a pair of right and left objective optical systems and a pair of right and left ocular (eyepiece) optical systems. Therefore, unlike the conventional binocular, the optical apparatus according to the invention dispenses with an erecting system, such as prisms and mirrors, thereby permitting reduction in cost and size.

What is claimed is:

1. A binocular comprising:
   a pair of optical systems which respectively has an optical axis, said pair of optical systems, respectively, including (a) an objective lens having a lens unit able to decenter relative to an optical axis of the optical system to which the lens unit belongs, (b) an eyepiece for observing an image formed by the objective lens, and (c) a positive lens,
   a connection member connecting to one another of said lens units; and
   driving means for driving said connection member connecting to said one another of said lens units for integrally decentering said lens units in the same direction with respect to said optical axes.

2. A binocular according to claim 1, wherein said driving means is disposed approximately in a middle position between the objective lenses of said pair of optical systems.

3. A binocular according to claim 1, further comprising a slide member supported in said binocular for sliding movement, independently of said driving means, in the direction of the optical axes of said pair of optical systems, and wherein said connection member and said driving means are disposed on said slide member, and focus adjustment of said pair of objective lenses is performed by sliding said slide member along the optical axes of said pair of optical systems.

4. A binocular according to claim 3, wherein diopter adjustment is performed by sliding said slide member within a plane including the optical axes of said pair of optical systems.

5. A binocular according to claim 1, further comprising detecting means for detecting shaking of said binocular, and wherein said driving means is arranged to drive said connection member on the basis of a detection output of said detecting means.

* * * * *

UNITED STATES PATENT AND TRADEMARK OFFICE
CERTIFICATE OF CORRECTION

PATENT NO. : 6,191,888 B1
DATED : February 20, 2001
INVENTOR(S) : Haruhiko Yamanouchi Page 1 of 1

It is certified that error appears in the above-identified patent and that said Letters Patent is hereby corrected as shown below:

Column 4,
Line 34, delete "I and II" and insert -- I and I' --.
Line 47, delete "t he" and insert -- the --.
Line 60, delete "to he" and insert -- to be --.

Column 12,
Line 37, delete "belongs, (b)" and insert -- belongs, said lens unit having a positive lens element, and (b) --.

Signed and Sealed this

Second Day of April, 2002

Attest:

Attesting Officer

JAMES E. ROGAN
Director of the United States Patent and Trademark Office